US012626446B2

(12) United States Patent
Thonat et al.

(10) Patent No.: US 12,626,446 B2
(45) Date of Patent: *May 12, 2026

(54) DISPLACEMENT-CENTRIC ACCELERATION FOR RAY TRACING

(71) Applicant: Adobe Inc., San Jose, CA (US)

(72) Inventors: Theo Thonat, Issy les Moulineaux (FR); Xin Sun, Santa Clara, CA (US); Tamy Boubekeur, Paris (FR); Nathan Carr, San Jose, CA (US); Francois Beaune, Annecy (FR)

(73) Assignee: Adobe Inc., San Jose, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 18/439,182

(22) Filed: Feb. 12, 2024

(65) Prior Publication Data

US 2024/0185503 A1 Jun. 6, 2024

Related U.S. Application Data

(63) Continuation of application No. 17/365,043, filed on Jul. 1, 2021, now Pat. No. 11,908,063.

(51) Int. Cl.
| | |
|---|---|
| *G06T 15/04* | (2011.01) |
| *G06T 15/06* | (2011.01) |
| *G06T 17/20* | (2006.01) |

(52) U.S. Cl.
CPC .............. *G06T 15/04* (2013.01); *G06T 15/06* (2013.01); *G06T 17/20* (2013.01)

(58) Field of Classification Search
CPC .......... G06T 15/04; G06T 15/06; G06T 17/20
See application file for complete search history.

(56) References Cited

U.S. PATENT DOCUMENTS

| | | | |
|---|---|---|---|
| 2008/0012853 A1* | 1/2008 | Geiger | .................... G06T 17/20 345/420 |
| 2011/0248997 A1 | 10/2011 | Munkberg et al. | |
| 2012/0154399 A1 | 6/2012 | Munkberg et al. | |
| 2012/0249742 A1* | 10/2012 | Abert | ...................... G06T 17/30 348/46 |

(Continued)

OTHER PUBLICATIONS

Get Started With Real-Time Ray Tracing, NVIDIA, Available Online at: https://developer.nvidia.com/rtx/raytracing#rtcores, 2020, 17 pages.

(Continued)

*Primary Examiner* — Phuc N Doan
(74) *Attorney, Agent, or Firm* — Kilpatrick Townsend & Stockton LLP

(57) ABSTRACT

Aspects and features of the present disclosure provide a direct ray tracing operator with a low memory footprint for surfaces enriched with displacement maps. A graphics editing application can be used to manipulate displayed representations of a 3D object that include surfaces with displacement textures. The application creates an independent map of a displaced surface. The application ray-traces bounding volumes on the fly and uses the intersection of a query ray with a bounding volume to produce rendering information for a displaced surface. The rendering information can be used to generate displaced surfaces for various base surfaces without significant re-computation so that updated images can be rendered quickly, in real time or near real time.

20 Claims, 7 Drawing Sheets

(56) References Cited

U.S. PATENT DOCUMENTS

| | | |
|---|---|---|
| 2020/0051316 A1 | 2/2020 | Laine et al. |
| 2021/0287431 A1 | 9/2021 | Woop et al. |
| 2022/0051467 A1 | 2/2022 | Woop et al. |
| 2022/0086583 A1 | 3/2022 | Park et al. |
| 2023/0084570 A1 | 3/2023 | Muthler et al. |

OTHER PUBLICATIONS

Vulkan Ray Tracing Final Specification Release, Khronos, Available Online at: https://www.khronos.org/blog/vulkan-ray-tracing-final-specification-release, 2020, 12 pages.
U.S. Appl. No. 17/365,043 , "Non-Final Office Action", Mar. 31, 2023, 9 pages.
U.S. Appl. No. 17/365,043 , "Notice of Allowance", Oct. 13, 2023, 10 pages.
Baboud et al., "Precomputed Safety Shapes for Efficient and Accurate Height-Field Rendering", Institute of Electrical and Electronics Engineers Transactions on Visualization and Computer Graphics, vol. 18, No. 11, Dec. 6, 2011, pp. 1811-1823.
Benthin et al., "Efficient Ray Tracing of Subdivision Surfaces Using Tessellation Caching", Proceedings of the 7th Conference on High-Performance Graphics, Aug. 2015, pp. 5-12.
Blinn , "Simulation of Wrinkled Surfaces", SIGGRAPH '78: Proceedings of the 5th Annual Conference on Computer Graphics and Interactive Techniques, Jan. 1978, pp. 286-292.
Burgess , "RTX on—The NVIDIA Turing GPU", IEEE Micro, vol. 40, No. 2, Mar.-Apr. 2020, 4 pages.
Carr et al., "Fast GPU Ray Tracing of Dynamic Meshes Using Geometry Images", Graphics Interface, 2006, pp. 203-209.
Chen et al., "A Prism-Free Method for Silhouette Rendering in Inverse Displacement Mapping", Computer Graphics Forum, vol. 27, No. 7, 2008, pp. 1929-1936.
Christensen et al., "Ray Differentials and Multiresolution Geometry Caching for Distribution Ray Tracing in Complex Scenes", Computer Graphics Forum, vol. 22, No. 3, Nov. 4, 2003, pp. 543-552.
Cook , "Shade Trees", ACM SIGGRAPH Computer Graphics, vol. 18, No. 3, Jul. 1984, pp. 223-231.
Dachsbacher et al., "Prism Parallax Occlusion Mapping with Accurate Silhouette Generation", Available Online at: http://developer.amd.com/wordpress/media/2012/10/Dachsbacher-Tatarchuk-Prism_Parallax_Occlusion_Mapping_with_Accurate_Silhouette_Generation(SI3D07).pdf, 2007, 1 page.
Donnelly , "Per-Pixel Displacement Mapping with Distance Functions", GPU Gems, vol. 2, No. 22, 2005, 15 pages.
Duff et al., "Building an Orthonormal Basis, Revisited", Journal of Computer Graphics Techniques, vol. 6, No. 1, 2017, 8 pages.
Figueiredo et al., "Affine Arithmetic: Concepts and Applications", Numerical Algorithms, vol. 37, No. 1-4, 2004, 46 pages.
Gilbert et al., "A Fast Procedure for Computing the Distance Between Complex Objects in Three-Dimensional Space", IEEE Journal on Robotics and Automation, vol. 4, No. 2, Apr. 1988, pp. 193-203.
Hanika et al., "Two-Level Ray Tracing with Reordering for Highly Complex Scenes", Proceedings of Graphics Interface, 2010, pp. 145-152.
Hart , "Sphere Tracing: A Geometric Method for the Antialiased Ray Tracing of Implicit Surfaces", The Visual Computer, vol. 12, No. 10, 1996, 50 pages.
Heidrich , "Ray-Tracing Procedural Displacement Shaders", Graphics Interface, 1998, 9 pages.
Hirche et al., "Hardware Accelerated Per-Pixel Displacement Mapping", Proceedings of Graphics Interface, 2004, 8 pages.
Hou et al., "Micropolygon Ray Tracing with Defocus and Motion Blur", Acm Siggraph, vol. 64, 2010, 10 pages.
Hunt et al., "Fast and Lazy Build of Acceleration Structures from Scene Hierarchies", IEEE Symposium on Interactive Ray Tracing, 2007, pp. 47-54.

Jeschke et al., "Interactive Smooth and Curved Shell Mapping", Proceedings of the 18th Eurographics Conference on Rendering Techniques, Jun. 2007, pp. 351-360.
Kaneko et al., "Detailed Shape Representation with Parallax Mapping", Proceedings of ICAT, 2001, pp. 205-208.
Lee et al., "Improved Relief Texture Mapping Using Minmax Texture", Fifth International Conference on Image and Graphics, 2009, pp. 1-5.
Lier et al., "A High-Resolution Compression Scheme for Ray Tracing Subdivision Surfaces with Displacement", Proceedings of the ACM on Computer Graphics and Interactive Techniques, vol. 1, No. 2, Aug. 2018, pp. 1-17.
Liu et al., "Seamless: Seam Erasure and Seam-Aware Decoupling of Shape from Mesh Resolution", ACM Transactions on Graphics (TOG), vol. 36, No. 6, Nov. 2017, 15 pages.
Lu et al., "Fast Visualization of Complex 3D Models Using Displacement Mapping", Graphics Interface, May 2009, pp. 7-14.
Mahovsky , "Ray Tracing with Reduced-Precision Bounding Volume Hierarchies", University of Calgary, Ph.D. Dissertation, 2005, pp. 1-4.
Martin et al., "Practical Ray Tracing of Trimmed NURBS Surfaces", Journal of Graphics Tools, vol. 5, No. 1, 2000, 17 pages.
Moller et al., "Fast, Minimum Storage Ray/Triangle Intersection", Journal of Graphics Tools, vol. 2, No. 1, 1997, 7 pages.
Moreton , "Watertight Tessellation Using Forward Differencing", Proceedings of the ACM SIGGRAPH/EUROGRAPHICS Workshop on Graphics Hardware, Aug. 2001, pp. 25-32.
Moule et al., "Efficient Bounded Adaptive Tessellation of Displacement Maps", Graphics Interface, 2002, 10 pages.
Munkberg et al., "Efficient Bounding of Displaced Bezier Patches", Proceedings of the ACM SIGGRAPH/EUROGRAPHICS Conference on High Performance Graphics, 2010, 10 pages.
Niebner et al., "Analytic Displacement Mapping Using Hardware Tessellation", ACM Transactions on Graphics (TOG), vol. 32, No. 3, Jun. 2013, pp. 1-9.
Niebner et al., "Feature-Adaptive GPU Rendering of Catmull-Clark Subdivision Surfaces", ACM Transactions on Graphics, vol. 31, No. 1, Jan. 2012, 11 pages.
Oh et al., "Pyramidal Displacement Mapping: A GPU Based Artifacts-Free Ray Tracing Through an Image Pyramid", VRST '06: Proceedings of the ACM Symposium on Virtual Reality Software and Technology, Nov. 2006, pp. 75-82.
Oliveira et al., "An Efficient Representation for Surface Details", UFRGS Technical Report, Jan. 26, 2005, 9 pages.
Paiva et al., "Approximating Implicit Curves on Triangulations with Affine Arithmetic", SIBGRAPI '12: Proceedings of the 2012 25th SIBGRAPI Conference on Graphics, Patterns and Images, Aug. 2012, pp. 94-101.
Pharr et al., "Geometry Caching for Ray-Tracing Displacement Maps", Eurographics Workshop on Rendering, 1996, 10 pages.
Pharr , "Rendering Complex Scenes with Memory-Coherent Ray Tracing", Proceedings of the 24th Annual Conference on Computer Graphics and Interactive Techniques, Aug. 1997, pp. 101-108.
Policarpo et al., "Real-Time Relief Mapping on Arbitrary Polygonal Surfaces", Proceedings of the 2005 Symposium on Interactive 3D Graphics and Games, Apr. 2005, pp. 155-162.
Policarpo et al., "Relaxed Cone Stepping for Relief Mapping", Available Online at: https://www.researchgate.net/publication/255571970_Relaxed_Cone_Stepping_for_Relief_Mapping, Jan. 2007, 16 pages.
Porumbescu et al., "Shell Maps", Available Online at: https://dl.acm.org/doi/10.1145/1073204.1073239, Jul. 2015, pp. 626-633.
Reich et al., "Illumination-Driven Mesh Reduction for Accelerating Light Transport Simulations", Computer Graphics Forum, vol. 34, No. 4, 2015, 10 pages.
Rump et al., "Implementation and Improvements of Affine Arithmetic", Nonlinear Theory and its Applications, IEICE, vol. 6, No. 3, 2015, pp. 341-359.
Selgrad et al., "A Compressed Representation for Ray Tracing Parametric Surfaces", ACM Transactions on Graphics, vol. 36, No. 1, Nov. 2016, 13 pages.
Sigg et al., "Fast Third-Order Texture Filtering", GPU Gems 2, 2005, 6 pages.

(56) References Cited

OTHER PUBLICATIONS

Smits et al., "Direct Ray Tracing of Displacement Mapped Triangles", In Eurographics Workshop on Rendering Techniques. Springer, 2000, pp. 1-13.

Stoll et al., "Razor: An Architecture for Dynamic Multiresolution Ray Tracing", ACM Transactions on Graphics, vol. 30, No. 5, Oct. 2011, 15 pages.

Szirmay-Kalos et al., "Displacement Mapping on the GPU-State of the Art", Computer Graphics Forum, vol. 25, No. 3, 2006, pp. 1-24.

Szirmay-Kalos et al., "Specular Effects on the GPU: State of the Art", In Computer Graphics Forum, Wiley Online Library, vol. 28, 2009, pp. 1-31.

Tatarchuk , "Dynamic Parallax Occlusion Mapping with Approximate Soft Shadows", In Proceedings of the 2006 Symposium on Interactive 3D Graphics and Games, 2006, pp. 63-69.

Tevs et al., "Maximum Mipmaps for Fast, Accurate, And Scalable Dynamic Height Field Rendering", In Proceedings of the 2008 Symposium on Interactive 3D Graphics and Games, 2008, 8 pages.

Wald et al., "Embree: A Kernel Framework for Efficient CPU Ray Tracing", ACM Transactions on Graphics (TOG), vol. 33, No. 4, Jul. 2014, pp. 1-8.

Wang et al., "Feature-Based Displacement Mapping", In Rendering Techniques, 2000, 13 pages.

Wang et al., "Generalized Displacement Maps", The Eurographics Association, 2004, 8 pages.

Wang et al., "View-Dependent Displacement Mapping", ACM Transactions on Graphics (TOG), vol. 22, No. 2, 2003, pp. 334-339.

Williams et al., "An Efficient And Robust Ray-Box Intersection Algorithm", In ACM SIGGRAPH, 2005, pp. 1-4.

Yerex et al., "Displacement Mapping with Ray-Casting in Hardware", In Proceedings of SIGGRAPH, 2004, 1 page.

* cited by examiner

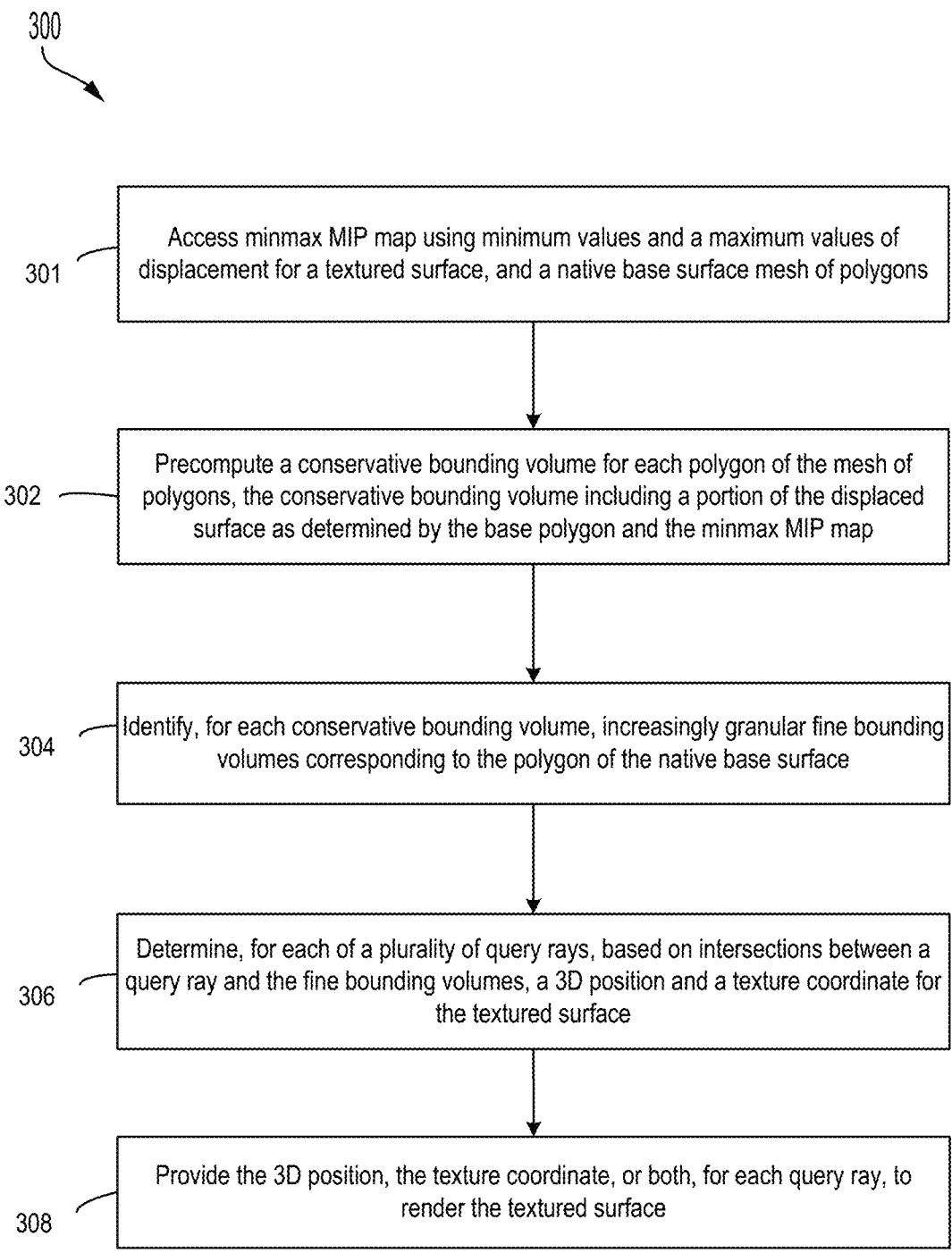

*300*

301 — Access minmax MIP map using minimum values and a maximum values of displacement for a textured surface, and a native base surface mesh of polygons 302 — Precompute a conservative bounding volume for each polygon of the mesh of polygons, the conservative bounding volume including a portion of the displaced surface as determined by the base polygon and the minmax MIP map 304 — Identify, for each conservative bounding volume, increasingly granular fine bounding volumes corresponding to the polygon of the native base surface 306 — Determine, for each of a plurality of query rays, based on intersections between a query ray and the fine bounding volumes, a 3D position and a texture coordinate for the textured surface 308 — Provide the 3D position, the texture coordinate, or both, for each query ray, to render the textured surface

FIG. 3

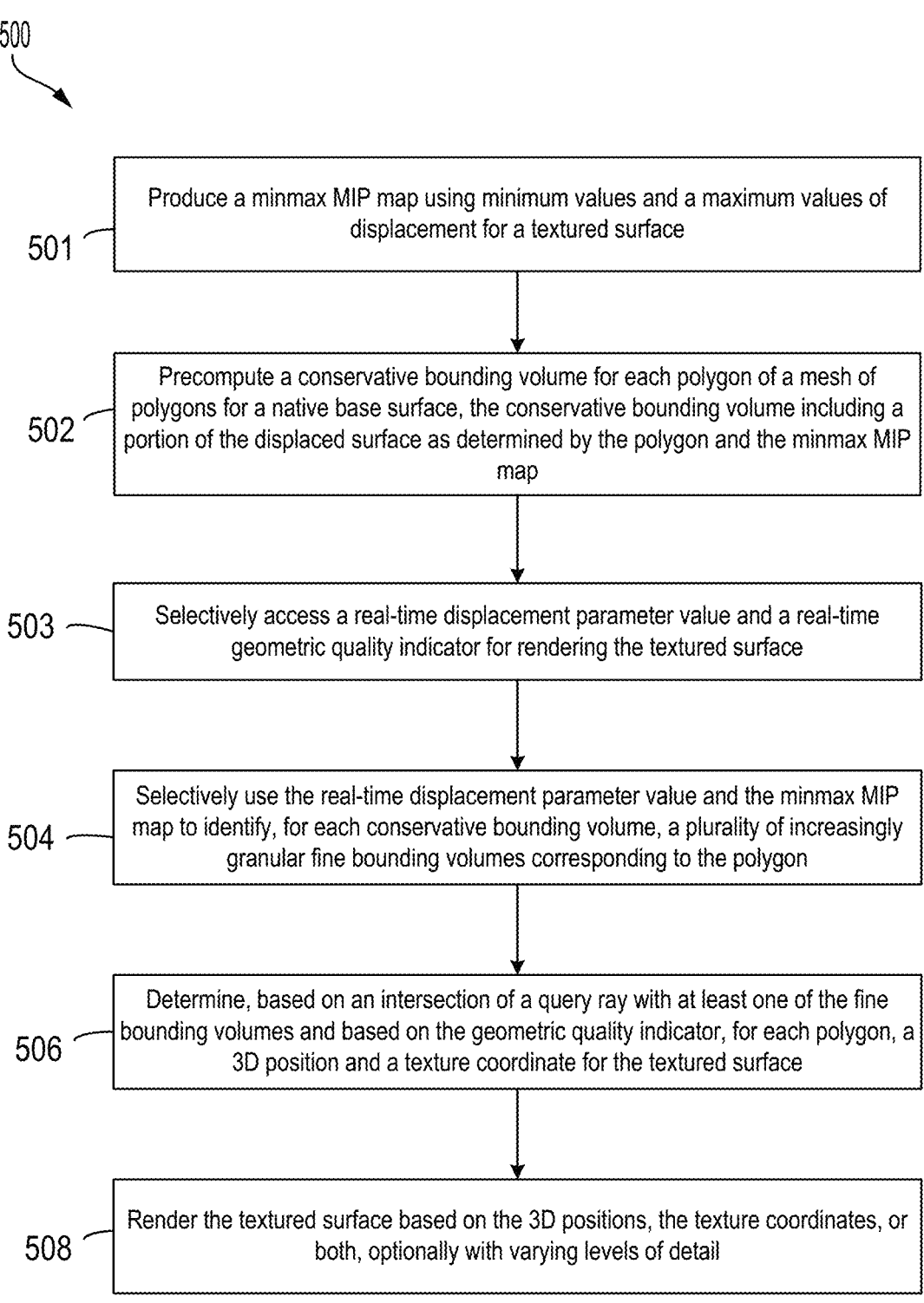

500

501 — Produce a minmax MIP map using minimum values and a maximum values of displacement for a textured surface 502 — Precompute a conservative bounding volume for each polygon of a mesh of polygons for a native base surface, the conservative bounding volume including a portion of the displaced surface as determined by the polygon and the minmax MIP map 503 — Selectively access a real-time displacement parameter value and a real-time geometric quality indicator for rendering the textured surface 504 — Selectively use the real-time displacement parameter value and the minmax MIP map to identify, for each conservative bounding volume, a plurality of increasingly granular fine bounding volumes corresponding to the polygon 506 — Determine, based on an intersection of a query ray with at least one of the fine bounding volumes and based on the geometric quality indicator, for each polygon, a 3D position and a texture coordinate for the textured surface 508 — Render the textured surface based on the 3D positions, the texture coordinates, or both, optionally with varying levels of detail

FIG. 5

DISPLACEMENT-CENTRIC ACCELERATION FOR RAY TRACING

CROSS-REFERENCE TO RELATED APPLICATIONS

This application is a Continuation of U.S. application Ser. No. 17/365,043, filed Jul. 1, 2021, the content of which is incorporated herein by reference.

TECHNICAL FIELD

The present disclosure generally relates to three-dimensional (3D) computer graphics. More specifically, but not by way of limitation, the present disclosure relates to techniques for ray tracing using displacement-centric acceleration to add textural details to 3D surfaces in an image or video.

BACKGROUND

Displacement mapping is a powerful tool for adding geometric details over an existing surface rendered by a computer system. Displacement maps move vertices of a polygonal mesh that represents the surface by varying amounts to create shallow or deep surface relief. Graphical processing units (GPUs) often support displacement mapping through a hardware tessellation unit that uses a rasterization-based approach to synthesize 3D images. However, rasterization rendering techniques are not capable of producing the same high degree of visual realism that is achievable by rendering using ray tracing.

Ray tracing surface meshes textured with high quality displacement requires a significant amount of memory. More precisely, ray-tracers must efficiently support random access spatial queries for geometric information. Large portions of the scene must be accessible and acceleration structures must be maintained in memory to support the fundamental ray query operation. Thus, ray tracing of textured surface meshes has been relegated to fields such as film production, where small portions of an image can be handled over long times to eventually achieve a realistically rendered scene. Designing map-displaced surfaces interactively in real time while enjoying a full physically-based ray traced rendering has been impossible with limited graphics memory because multiple map tilings quickly saturate the graphics memory.

SUMMARY

Certain aspects and features of the present disclosure relate to displacement-centric acceleration for ray tracing. For example, a computer-implemented method involves accessing, by a rendering system, a native base surface defined by a mesh of polygons and a map of displacement values useable to render a textured surface corresponding to the native base surface. The method further involves, for a polygon of the native base surface, precomputing a conservative bounding volume for the polygon. The conservative bounding volume includes a portion of a displaced surface as determined by the polygon and the map of displacement values. The method further involves identifying, by a displacement acceleration module of the rendering system, based on the conservative bounding volume, a number of increasingly granular bounding volumes corresponding to the polygon, as well as determining, by the displacement acceleration module, an intersection of a query ray with at least one of the increasingly granular bounding volumes to provide a 3D position, a texture coordinate, or both, usable for rendering the textured surface. The method in this example further involves storing, by the displacement acceleration module, the 3D position, the texture coordinate, or both, configured for rendering the textured surface using the native base surface.

Other embodiments of this aspect include corresponding computer systems, apparatus, and computer programs recorded on one or more computer storage devices, each configured to perform the actions of the methods.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

Features, implementations, and advantages of the present disclosure are better understood when the following Detailed Description is read with reference to the accompanying drawings.

FIG. 3 is a flowchart of an example of a process for displacement-centric acceleration for ray tracing, according to some aspects of the present disclosure.

FIG. 5 is a flowchart of an example of another process for displacement-centric acceleration for ray tracing, according to some aspects of the present disclosure.

DETAILED DESCRIPTION

Figure 1:
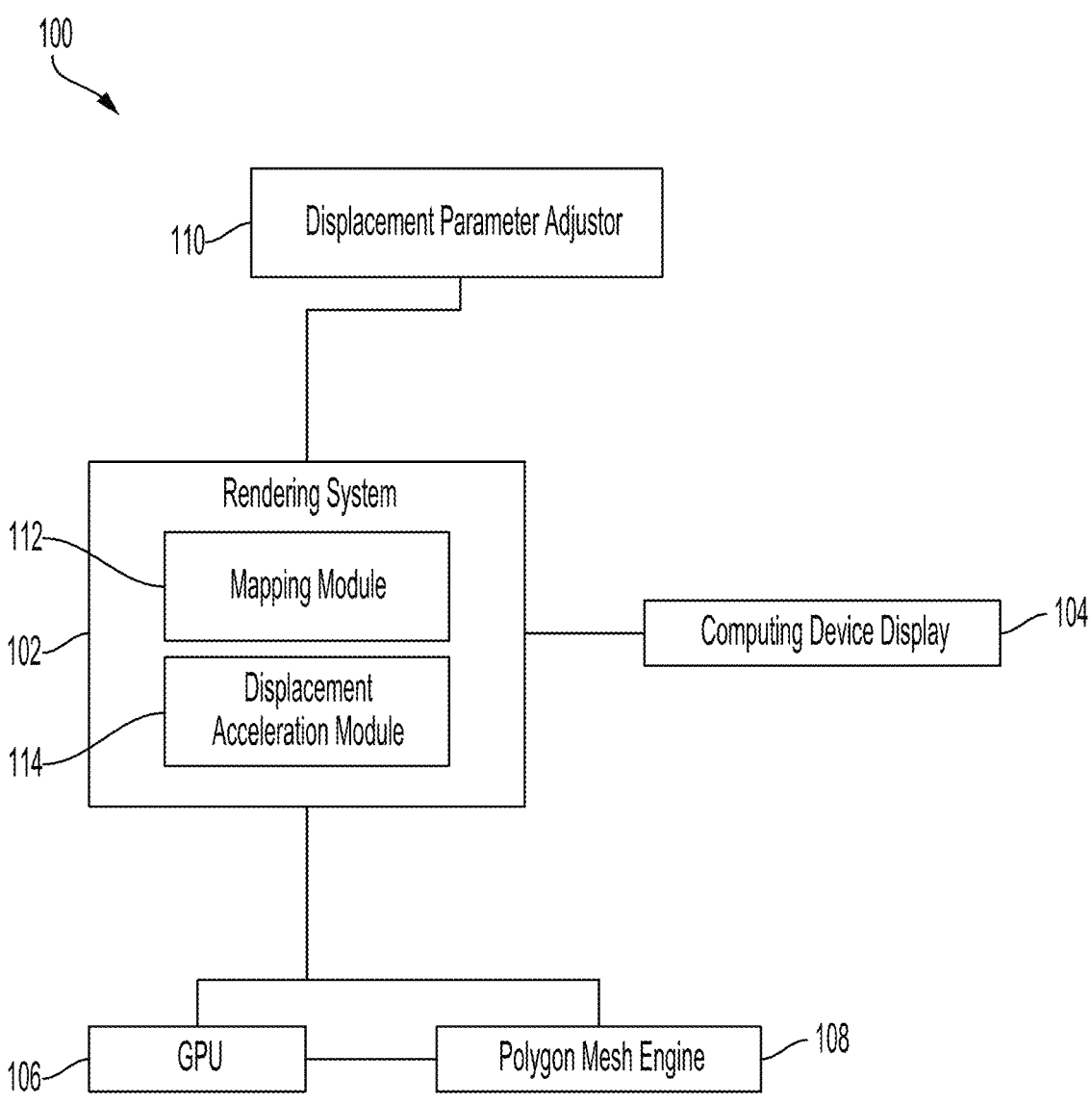
FIG. 1 is a diagram showing an example of a computing environment for displacement-centric acceleration for ray tracing, according to some aspects of the present disclosure.

As described above, existing graphics systems provide mechanisms to apply displacement maps to surfaces using hardware tessellation and a rasterization-based approach to synthesize three dimensional, textured surfaces. Using tessellation and rasterization, displaced surfaces can be designed interactively, in real-time. However, such surfaces cannot be rendered with the same high degree of visual realism that is achievable by rendering using ray tracing. Alternatively, ray tracing techniques can be used to apply a displacement map to a surface if long compute times are permitted for rendering. However, most graphical design systems do not have sufficient graphical memory to allow design of map-displaced surfaces with interactive rendering in real time using realistic, physically-based, ray-traced rendering. Additionally, the displacement must be recomputed if the base surface is changed, slowing the design process even further.

Aspects and features of the present disclosure provide a direct ray-tracing operator with low memory footprint for surfaces enriched with displacement maps. A displacement-centric acceleration structure is defined that can be texture-mapped for polygonal meshes; however, a fine bounding volume hierarchy used to determine a query ray intersection with the displaced surface does not need to be stored in memory and can be generated on the fly on a per-ray basis in real time. Further, the acceleration structure can be decoupled from the base surface so that it does not need to be recomputed each time the base surface is changed. All computations can be done relative to the native base surface without tessellation while providing visually smooth inter-active editing of displacement content with the high degree of visual quality made possible by ray-traced rendering.

The following non-limiting example is provided to intro-duce certain aspects. In this example, a graphics editing application can be used to manipulate displayed represen-tations of 3D objects that include surfaces with displacement textures. An application can access a displacement map corresponding to a displaced surface and produce hierar-chies of bounding volumes corresponding to polygons of a native base surface. The displacement map includes texels that serve as fundamental units in texture space. A texel is equivalent to a pixel of an image. Specifically, a displace-ment map is a two-dimensional (2D) image (grid of values), where each value is a single scalar (representing the height of displacement). Texels correspond to values stored in 2D images being placed onto surfaces (texture maps, normal maps, displacement maps). A graphics editing application produces a minmax multum in parvo (MIP) map (a map of maximum and minimum values from the displacement map) and uses the minmax MIP map as a base-surface indepen-dent acceleration structure.

When producing an image of the displaced, or textured, surface, a displacement acceleration module of the applica-tion identifies, for each polygon of the base surface, a conservative bounding volume including a portion of the displaced surface. The displacement acceleration module further identifies at run time, increasingly granular fine bounding volumes to define a hierarchy of bounding vol-umes. A bounding volume may be referred as a fine bound-ing volume or a granular bounding volume when it is inside the initially defined, conservative bounding volume. These bounding volumes may be referred to as increasingly granu-lar in the sense that they become smaller and smaller until a desired level of precision is achieved. The displacement acceleration module can provide the information necessary to render the image of the displaced surface by determining the intersection of a query ray with each of the bounding volumes in the hierarchy until a determined intersection is close to where the query ray would intersect the displaced surface based on the level of precision as programmatically determined and/or selected. The fine bounding volumes are transient; computed, used, and discarded. They are not retained in graphics memory beyond the current computa-tions. As such, a full bounding volume tree is never pro-duced in memory. Thus memory availability is preserved, allowing for very large scenes to be rendered much more quickly than would be possible if precomputed acceleration structures needed to be retained in memory. The graphics editing application can optionally incorporate displacement parameters when generating the bounding volumes, and these displacement parameters can dictate such characteris-tics as the tiling and height scaling of the displaced surface.

If the displaced surface is used for a different base surface of the 3D object or for multiple base surfaces, the above-described process can be repeated by the graphics editing application without recomputing the minmax MIP map, so that updating the rendered image takes place quickly (e.g., in real time or near real time) with minimal additional graphics memory usage. The information necessary to ren-der an image of a displaced surface can be used with different rendering systems without re-computation.

FIG. 1 is a diagram showing an example of a computing environment 100 for displacement-centric ray tracing, according to some aspects of the present disclosure. The computing environment 100 includes a rendering system 102, a display device 104, a polygon mesh engine 108, and a displacement parameter adjustor 110. In some examples, the computing environment 100 includes other suitable components for performing operations relating to displace-ment-centric ray tracing. As illustrated, the rendering system 102 is communicatively coupled to the display device 104, the polygon mesh engine 108, and the displacement param-eter adjustor 110.

In some examples, the display device 104 includes a monitor or other suitable type of display for displaying one or more textured surfaces. For example, the rendering sys-tem 102 provides data or commands for rendering a base surface, a displaced surface, and the like to accelerate memory alteration for displaying the base surface, the dis-placed surface, and the like on the display device 104. The polygon mesh engine 108, in some examples, defines a base surface using geometric objects. For example, the polygon mesh engine 108 receives the base surface and defines the base surface as a collection of triangles or other suitable geometric objects for generating polygonal meshes to define the base surface. The displacement parameter adjustor 110 adjusts displacement parameters with respect to determining bounding volume hierarchies. For example, an input device or memory of the computing environment 100 provides input to the displacement parameter adjustor 110, and the displacement parameter adjustor 110 provides adjusted parameters to the rendering system 102 to adjust rendering of the textured surfaces. In other examples, the displacement parameter adjustor 110 automatically adjusts the displace-ment parameters. For example, a component of the comput-ing environment 100, such as the mapping module 112, provides input into the displacement parameter adjustor 110. In some examples, the input includes a displaced surface, which is usable by the displacement parameter adjustor 110 to determine optimal displacement parameters to use for rendering a textured surface.

In some examples, the rendering system 102 includes a mapping module 112 and a displacement acceleration mod-ule 114. The mapping module 112 produces or otherwise generates a map of a displaced surface with respect to a base surface for rendering a textured surface. In some examples, the mapping module 112 accesses or otherwise communi-cates with the polygon mesh engine 108 to receive polygo-nal meshes associated with the base surface. The mapping module 112, in these examples, generates the map using the polygonal meshes. The mapping module 112 provides the map to the displacement acceleration module 114. The rendering system 102 (including the mapping module 112 and the displacement acceleration module 114), the polygon mesh engine 108, the displacement parameter adjustor 110 may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments.

The displacement acceleration module 114 identifies bounding volumes with respect to query rays and the map of the displaced surface. Additionally, the displacement acceleration module 114 applies determined bounding volume hierarchies to a base surface to allow a textured surface to be rendered with respect to the displaced surface. For example, the displacement acceleration module 114 receives the map from the mapping module 112, determines bounding volume hierarchies for a set or a subset of query rays, and applies the bounding volume hierarchies to the base surface for rendering the textured surface. In some examples, the displacement acceleration module 114 receives adjusted displacement parameters from the displacement parameter adjustor 110. Additionally or alternatively, the displacement acceleration module 114 receives an indication of geometric quality from the displacement parameter adjustor 110 or other suitable component of the computing environment 100. In some examples, the displacement acceleration module 114 uses the indication of geometric quality to approximate intersections between query rays and a displaced surface. The approximations include step approximations, piecewise approximations, non-linear approximations, and any other suitable geometric approximations.

In some examples, portions of the rendering system 102 and the polygonal mesh engine 108 can be implemented by a graphics processing unit (GPU). For example, the displacement acceleration module 114 can be implemented by the GPU. In some examples, the GPU performs operations associated with the rendering system 102, the polygon mesh engine 108, the displacement acceleration module 114, or other suitable component of the computing environment 100. In one such example, the GPU uses the displacement acceleration module 114 to render a textured surface.

One of ordinary skill in the art would recognize many possible variations, alternatives, and modifications. For example, in some implementations, the rendering system 102 can be implemented using more or fewer systems or subsystems than those shown in FIG. 1, may combine two or more subsystems, or may have a different configuration or arrangement of the systems or subsystems.

Figure 2:
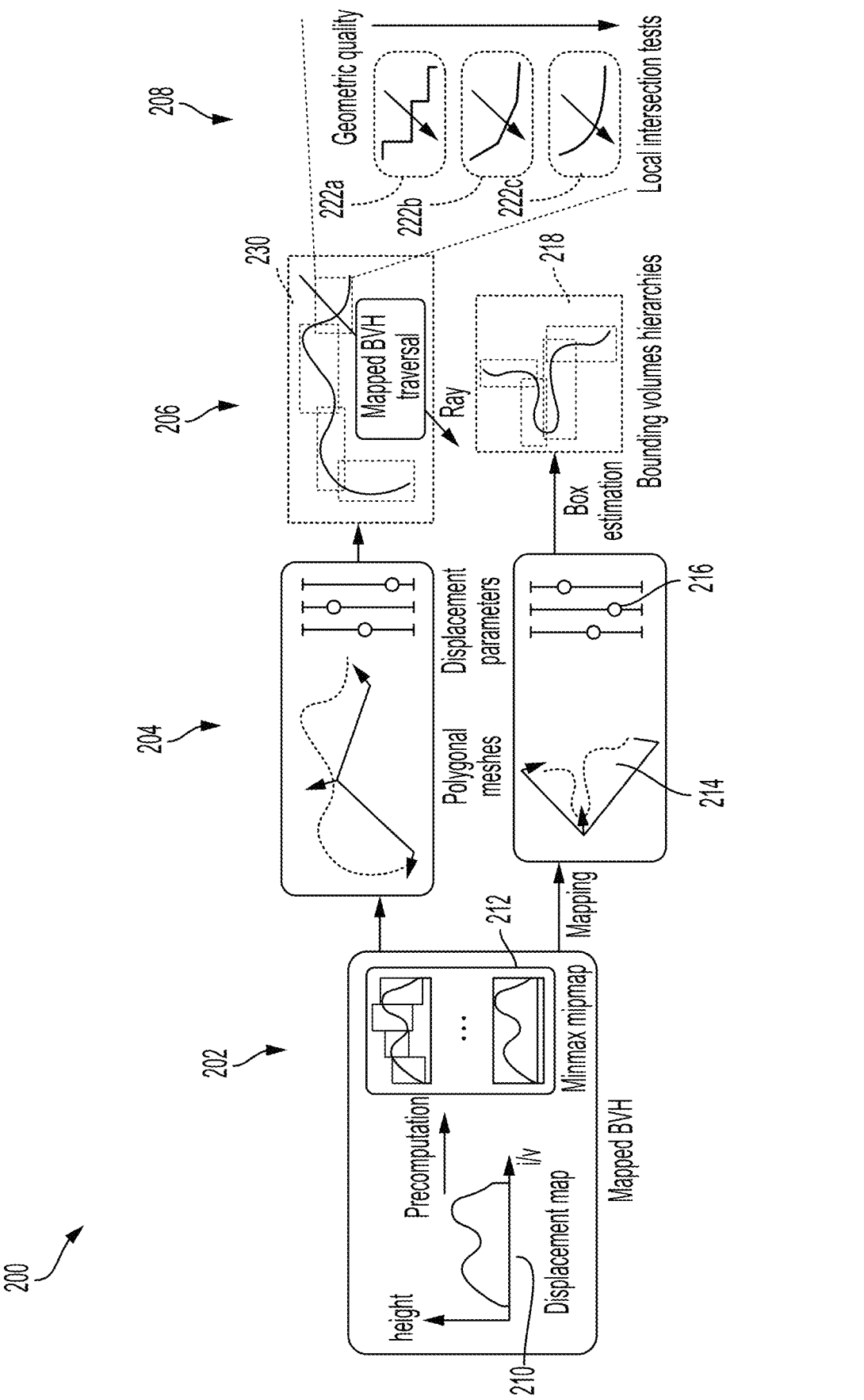
FIG. 2 is a diagram showing an example of a data flow for displacement-centric acceleration for ray tracing, according to some aspects of the present disclosure.

FIG. 2 is a diagram showing an example of a data flow 200 for displacement-centric acceleration, according to some aspects of the present disclosure. As illustrated, the data flow 200 includes four stages 202, 204, 206, and 208. The stage 202 involves precomputation of a minmax MIP map from a displacement map. The displacement is ultimately used to produce a mapped bounding volume hierarchy (BVH) for each polygon of a base surface mesh. A displacement map can correspond to one or more polygons in a base surface mesh or to multiple base surface meshes. Only a single copy of the displacement map needs to be stored in memory and can be referenced and instanced multiple times. The storage for the displacement map does not depend on how many times, or where, the displacement map is used to render textured surfaces. Furthermore, the displacement map comes with its own bounding hierarchy which is efficient for building on-the-fly data structures for testing whether a ray hits the surface of a displaced mesh. The displacement map stores a collection of downsampled images (half the size in width and height) at each level down to 1×1 to form an image pyramid. The (texel) values in the image pyramid are the min and max displacements of the four texel values stored in the next level down (finer level of the pyramid).

The mapping module 112, or other suitable component of the computing environment 100 such as the displacement acceleration module 114, generates one or more minmax MIP maps 212 using one or more maximum values and one or more minimum values of displacement relating to texels of the displaced surface as determined from the displacement map. In some examples, the displacement acceleration module 114 determines, for one or more texels of a displacement map, a maximum displacement value and a minimum displacement value.

The stage 204 involves accessing polygonal meshes 214 and displacement parameters 216 relating to the displaced surface. The displacement parameters determine how the displacement will be generated relative to the base mesh, for example, by scaling up the amplitude of the displacement to make the displacement more or less extreme, or changing the tiling to determine many times a displaced image repeats across the surface. How the displaced surface aligns with the base surface can also be dictated by displacement parameters. These parameters can be adjusted without changing the base surface and without increasing memory requirements. With those parameters set, a conservative bounding volume is precomputed that encompasses a base mesh polygon and a corresponding point on the final displaced surface. The tighter this conservative bounding volume is relative to the polygon and the displaced point, the more efficient the remaining computations will be. The conservative bounding volumes (shown as dotted lines in 230 of stage 206) for the base domain polygons act as a top-level for hierarchies of fine bounding volumes (shown in 218) used in stage 206. Each hierarchy of increasingly fine bounding volumes includes, and is produced based on, a conservative bounding volume. Each hierarchy serves as a data structure for ray tracing to ultimately determine where a query ray would intersect a displaced surface corresponding to a native base surface. The fine bounding volume hierarchy is used at rendering time and then discarded, minimizing memory use and computational resources needed to render an image.

The conservative bounding volumes are "precomputed" and fully stored in memory, while the hierarchies of fine bounding volumes are used to determine the prospective intersection of the query ray with a displaced surface, and then forgotten. A GPUs native capabilities can be used to accelerate precomputation of the conservative bounding volumes. The storage required for the conservative bounding volumes is on the order of the size of the base mesh polygons, rather than what would be required for the texel resolution of the displacement map or the final displaced surface. In some examples, the polygonal meshes 214 are provided to the mapping module 112, the displacement acceleration module 114, or a combination thereof, by the polygonal mesh engine 108. The polygonal meshes 214 define the base surface and include geometric objects or entities such as triangles or other suitable geometric objects. In some examples, the displacement parameters 216 are provided to the mapping module 112, the displacement acceleration module 114, or a combination thereof, by the displacement parameter adjustor 110. In some examples, the displacement parameters 216 are determined automatically by the displacement parameter adjustor 110, and in other examples, the displacement parameters 216 are adjustable via user input into the displacement parameter adjustor 110 or into the rendering system 102. The polygonal meshes 214 and the displacement parameters 216 are usable by the displacement acceleration module 114 for determining bounding volumes, for determining bounding volume hierarchies, and for providing values to render a textured surface.

The stage 206 involves providing a hierarchy of increasingly granular fine bounding volumes corresponding to each base mesh polygon and any precomputed conservative bounding volume intersected at render time by a query ray. Stage 206 can also determine where a query ray intersects any bounding volume. In some examples, the displacement acceleration module 114 uses the displacement map 210, the polygonal meshes 214, and the displacement parameters 216 to determine bounding volumes intersected with query rays. For example, for each query ray, the displacement acceleration module 114 determines a bounding volume in 218 for the query ray by determining bounding volumes intersecting with the query ray with an increasing density relative to the initial conservative bounding volume using the minmax MIP map 212. The displacement acceleration module 114 uses the bounding volume hierarchies to identify the bounding volume containing the intersection point of the query ray with the textured surface if the displacement map were applied to the base surface. For example, in FIG. 2, for the query ray shown in 230, the displacement acceleration module 114 identifies the initial bounding volume intersected by the query ray. The displacement acceleration module 114 further refines the intersecting bounding volume using the fine bounding volume hierarchy associated with the initial bounding volume 232 to determine an additional bounding volume with a higher granularity. The displacement acceleration module 114 can repeat this process until the bounding volume with the highest density or granularity desired is reached, or when other conditions are satisfied, such as a target displacement set by the displacement parameters is achieved. In this way, the displacement acceleration module 114 can use the bounding volume hierarchy to identify the intersection between each query ray and the textured surface.

The stage 208 involves adjusting or otherwise determining the intersection point 220 according to a setting for geometric quality. In some examples, the displacement acceleration module 114 receives an indication of geometric quality from a suitable component of the computing environment 100, for each query ray or a set of query rays. The displacement acceleration module 114 applies a different approximation for a query ray's intersection with the displaced surface within the identified bounding volume based on the geometric quality. The intersection point can then be calculated based on the approximation of the surface and the position of the query ray. In FIG. 2, three local intersection tests 222*a-c* with three different geometric quality settings are illustrated. The illustration 222*a* indicates a low geometric quality where the intersection of a query ray with the displaced surface is determined based on the bounding volumes alone. The illustration 222*b* indicates a medium geometric quality where the displaced surface (or textured surface) within the identified bounding volume is approximated using a very small area of the actual displacement map corresponding to a polygon of the base surface. The illustration 222*c* indicates a high geometric quality where the displaced surface or textured surface within the identified bounding volume is determined relying completely on information from the displacement map. In some implementations, the displacement acceleration module 114 determines the geometric quality for rendering the textured surface using the geometric quality indicator. That is, the displacement acceleration module 114 correlates the local intersection determination with the received indication of geometric quality, and the local intersection test that correlates most closely with the indication of geometric quality is used to render the textured surface.

In some examples, FIG. 2 illustrates techniques for computing and using an acceleration structure designed for the displacement map with minimal coupling to the base surface. Such an acceleration structure can then be used to generate a displaced surface corresponding to any base surface or base mesh which is used in ray tracing the associated displaced surfaces with low memory overhead. The mapped bounding volume hierarchies map the precomputations of the stage 202 in texel coordinate space to 3D bounding volumes in object space. In some examples, this is a hybrid between a 2D hierarchical space division structure at the texture level and an implicit bounding volume hierarchy for the displaced object.

In some examples, a displaced surface is defined for any texel or texture coordinate (u,v) as:

$$S(u,v)=P(u,v)+h(u,v)N^{\wedge}(u,v) \tag{1}$$

where P is the base surface, h is a sampling of the displacement map, and N^ is a normalization of the base surface normal N. For the base surfaces considered, P and N are defined per triangle or other geometric object of polygonal meshes 214, and the displaced surface is the union of the displaced surface restricted to each base triangle or other geometric object of polygonal meshes 214. Ray tracing the displaced surface is performed on a single base geometric object.

A minmax MIP map is used as an acceleration structure for the displacement, storing for each texel a minimum value and a maximum value of displacement over the uv-domain corresponding to the texel. The uv-domain the 2D coordinate domain (u,v) defined for the displaced surface or a subset thereof. More specifically, given a sampling h of the displacement map, the minmax MIP map $$M_{ij}^k$$

is:

$$M_{ij}^k = \left(\underline{M}_{ij}^k, \overline{M}_{ij}^k\right) = \operatorname*{minmax}_{\Omega_{ij}^k}(h(u,\,v)) \tag{2}$$

where $\Omega_{ij}{}^k$ is the uv-domain corresponding to a texel, defined by $(j2^k{\leq}W$ $u{\leq}(j{+}1)2^k)^{\wedge}(i2^k{\leq}H$ $v{\leq}(i{+}1)2^k)$ for any integers i, j, k, with W and H respectively the displacement map width and height. This minmax MIP map is a 2-channel texture with the same dimensions and same number of MIP map levels as the input displacement map and is independent from the base surface on which the displacement is mapped on. In practice, the minmax MIP map is computed, starting from height sampling dependent formulas for level k=0, and using the following recursive formula for the other levels:

$$M_{ij}^k = \operatorname*{minmax}_{\substack{2i \le s \le 2i+1 \\ 2j \le t \le 2j+1}} \left(M_{s,t}^{k-1}\right) \tag{3}$$

In order to define an implicit acceleration structure, the displacement acceleration module 114 computes on the fly (e.g., in substantially real-time), for each MIP map texel, a conservative 3D axis-aligned bounding box of the displaced surface. Since the base surface is not always flat, the deviation induced by the base triangle interpolated normal is estimated. Affine arithmetic is used to estimate and combine positions on the base surface, displacement values and interpolated unit normals. Affine arithmetic allows correlation between the estimated variables, meaning that approximations can cancel themselves out instead of always being accumulated. In affine arithmetic, quantities are affine forms, which are convex sets with central symmetry, so both an input texel and the output bounding box can be represented by a single affine form Affine arithmetic represents quantities as affine combinations of symbolic noise variables whose values lie in the range [−1, 1] and which describes either sources of variation in the data or approximations made during computations. The coefficients from the noise variables εu and εv are tracked, related to the texture coordinates u and v. This allows correlation to be made between the base position and the base normal to compute bounding boxes or volumes for the displaced surface. Other sources of noise encountered during computations are merged into a single symbolic variable ε. Therefore, any scalar or vector quantity x considered can be written as:

$$x=x_c+x_u\epsilon_u+x_v\epsilon_v+x_K\epsilon_K \qquad (4)$$

where $x_c$, $x_u$, $x_v$, $x_K$ are constants with the same number of channels as x. For readability purposes, we can omit the symbolic variables.

The minmax MIP map is interpreted, in some examples, as a pre-computation of height intervals for every texel uv-domain, and the affine form is retrieved that is associated with the height relative to a texel from a single minmax MIP map fetch:

$$h(u, v) = \frac{1}{2}[\overline{M}_{ij}^k + \underline{M}_{ij}^k, 0, 0, \overline{M}_{ij}^k - \underline{M}_{ij}^k] \qquad (5)$$

Any possible correlation between the height values and the base surface is lost. As the uv-domain $\Omega_{ij}^k$ is simply an axis-aligned box, the uv-affine form is computed as:

$$uv = 2^k\left[\left(\frac{j+1/2}{W}, \frac{i+1/2}{H}\right), \left(\frac{1}{2W}, 0\right), \left(0, \frac{1}{2H}\right), (0, 0)\right] \qquad (6)$$

Affine forms for the base position and normal are obtained given the uv-affine form.

Combining in Equation 1 the affine forms for displacement, base position and base normal, an affine form is obtained for the displaced surface relatively to a given texel:

$$S(uv)=[S_c, S_u, S_v, S_k]$$

FIG. 3 is a flowchart of an example of a process 300 for displacement-centric acceleration for ray tracing, according to some aspects of the present disclosure. One or more computing devices (e.g., the rendering system 102) implement operations depicted in FIG. 3 by executing suitable program code (e.g., the mapping module 112, the displacement acceleration module 114, or both). For illustrative purposes, the process 300 is described with reference to certain examples depicted in the figures. Other implementations, however, are possible.

At block 301, the process 300 involves using a minmax MIP map and a native, base surface mesh of polygons. In some examples, the mapping module 112 generates the minmax MIP map of a displaced surface. The MIP map includes minimum values and maximum values of displacement for a textured surface to be rendered. The native base surface can be a closed surface of an entire object to be depicted, or just a portion of an object or a larger surface. Additionally or alternatively, the MIP map describes a set of texels. The MIP map is based on a displacement map. A displacement map is a two dimensional texture. It contains as many texels as dictated by its resolution. For example, a 1024×1024 displacement map is roughly made of 1 million texels. In some examples, the minmax MIP map is a list of texels with decreasing resolution, starting from the initial displacement map resolution until the resolution is 1×1. Thus, the smallest minmax MIP map in these examples describes only one texel.

At block 302, the process 300 involves precomputing a conservative bounding volume for each polygon in the native base surface under consideration. A conservative bounding volume includes a portion of the displaced surface as determined by the base polygon and by using the minmax MIP map. Bounding volumes are represented by dotted boxes in FIG. 2. A conservative bounding volume corresponds to the first level of the minmax MIP map. The displacement acceleration module 114 identifies the conservative bounding volume. The conservative bounding volume is a bounding volume of minimum granularity that will be associated with a query ray during ray tracing. The conservative bounding volume is computed using a texel's information from the minmax MIP map, called the root. This root depends on the base polygon currently being considered, and is based on the smallest texel corresponding the whole base polygon in texture space. Additional details are discussed below with respect to equations 9, 10, and 11.

At block 304, the process 300 involves identifying, at run time, for each conservative bounding volume, increasingly granular fine bounding volumes corresponding to the polygon of the native base surface. These increasingly granular fine bounding volumes form a hierarchy of bounding volumes for programmatic traversal by a query ray. The hierarchy of bounding volumes is based on the conservative bounding volume and is thus also based on the minmax MIP map. In some examples, the displacement acceleration module 114 identifies the additional bounding volumes and determines the hierarchy of bounding volumes. The hierarchy of bounding volumes represents an order of bounding volumes intersected by the query ray.

At block 306, the process 300 involves determining, for each query ray, based on intersections between the query ray and at least one of the fine bounding volumes, a 3D position and a texture coordinate for the textured surface to be rendered. The fine bounding volume for which the intersection is used can be determined in part by displacement parameters, which may include an indication of the precision desired and thus how small the bounding volumes become. The size of the hierarchy of bounding volumes, in some examples, is determined by the relative density or granularity of the initial bounding volume and the additional bounding volumes needed to localize the query ray if the displacement height is increased. The functions of block 304 and block 306 can be used in implementing a step for producing a 3D position and/or a texture coordinate for each polygon of the native base surface based on an intersection of a query ray with at least one of the fine bounding volumes corresponding to the polygon and associated with the conservative bounding volume.

At block 308, the process 300 involves providing the 3D position, the texture coordinate, or both for rendering the textured surface. This information can be used by a rendering system to render the displaced surface. This information can be supplied through an interface to different rendering systems, or a rendering system can be reconfigured to render the displaced surface in different ways in real time, without recomputing the 3D position or the texture pixel.

While described with respect to one query ray, the blocks 304, 306, and 308 are iterative in nature. That is, the blocks 304, 306, and 308 are repeatable for each query ray of the set of query rays for allowing a rendering system such as rendering system 102 to render the textured surface. These computations are handled based on the native base surface, meaning that the base surface of polygons is not tessellated or otherwise changed for processing. The number of polygons is not changed. The entire bounding volume hierarchy that can be efficiently combined with any native base polygon mesh to produce, on the fly, an acceleration hierarchy that enables efficient computation of where a ray intersects the displaced surface while leaving the base surface substantially undisturbed.

Figure 4:
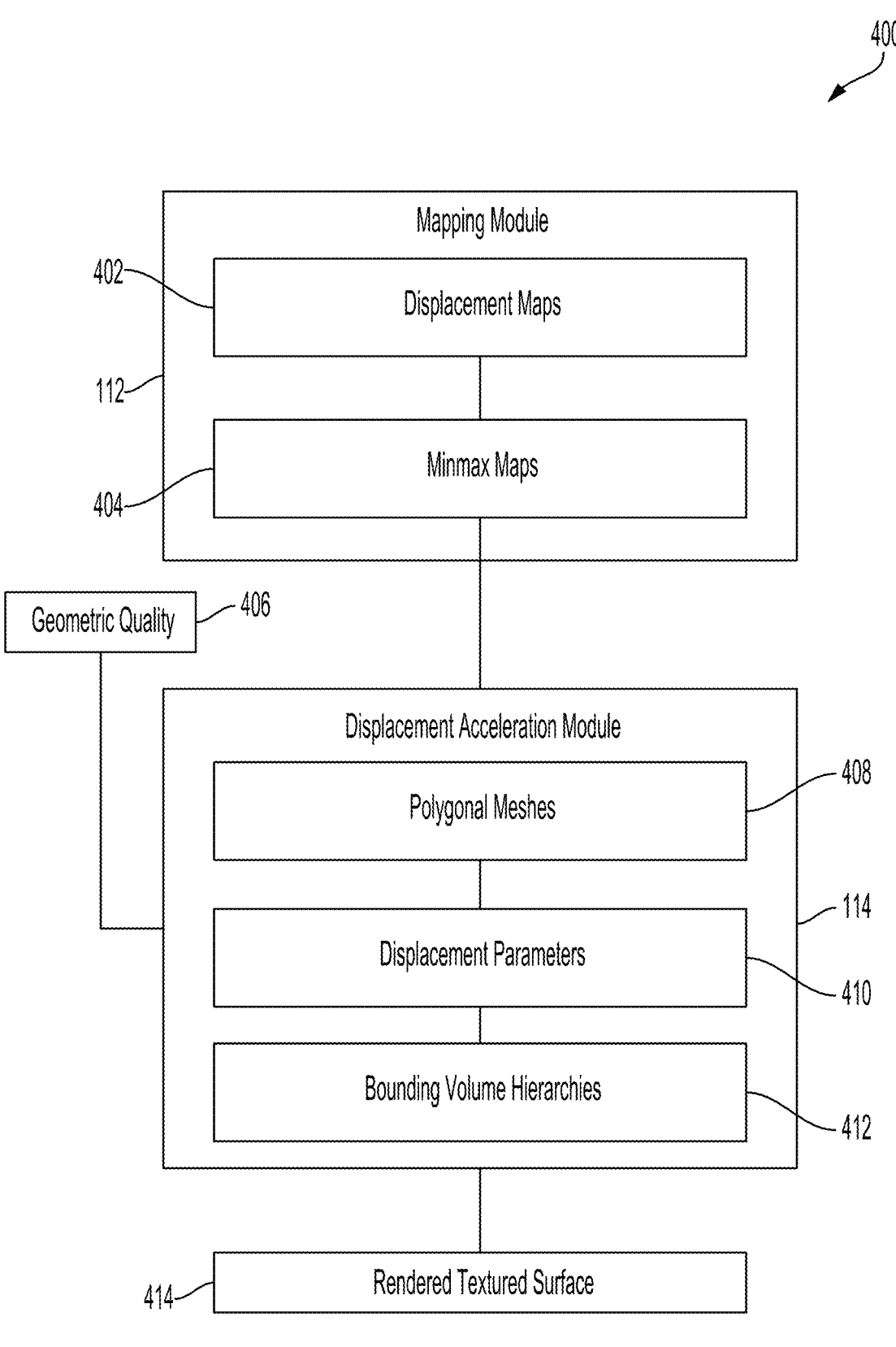
FIG. 4 is a diagram showing an example of a system for displacement-centric acceleration for ray tracing, according to some aspects of the present disclosure.

FIG. 4 is a diagram showing an example of a system 400 for displacement-centric acceleration for ray tracing, according to some aspects of the present disclosure. The system 400, as illustrated, includes the mapping module 112 and the displacement acceleration module 114. Additionally, as illustrated, the mapping module 112 includes displacement maps 402 and minmax MIP maps 404. The mapping module 112 produces or otherwise generates the displacement maps 402 using a set of texels. In some examples, the displacement maps 402 are generated with respect to one or more generalized base surfaces. The mapping module 112 additionally generates the minmax MIP maps 404 using minimum and maximum values of displacement over the set of texels similar to that described above. For example, the mapping module 112 generates the minmax MIP maps 404 for storing for each texel of the texels a minimum value and a maximum value of displacement over the displaced surface. In some examples, the mapping module 112 provides the displacement maps 402 and the minmax MIP maps 404 to the displacement acceleration module 114.

The displacement acceleration module 114 accesses the displacement maps 402 and minmax MIP maps 404 from the mapping module 112. Additionally, the displacement acceleration module 114 receives geometric quality 406. In some examples, the geometric quality 406 includes an indication of geometric quality determined by other components of the system or other system or input by a user of system 400 through a suitable component of a computing device such as shown and described below with respect to FIG. 7. The geometric quality 406 is usable to determine quality or a level of detail with regards to a rendered texture. For example, if the geometric quality 406 indicates a high level of quality, then the displacement acceleration module 114 provides rendering information using the actual displacement map once an intersection of the query ray with the finest bounding volume is determined.

Additionally, or alternatively, the displacement acceleration module 114 receives the polygonal meshes 214 for native base surfaces and the displacement parameters 216 from the polygonal mesh engine 108 and the displacement parameter adjustor 110, respectively. Additionally, the displacement acceleration module 114 is configured to perform precomputations of conservative bounding volumes with respect to query rays and the polygonal meshes 214. In some examples, the precomputations are usable to improve efficiency of traversing the hierarchies of bounding volumes.

The displacement acceleration module 114 can use the displacement maps 402, the minmax MIP maps 404, the polygonal meshes 214, the displacement parameters 216, and the geometric quality 406, or a subset thereof, to render a textured surface. For example, the displacement acceleration module 114 determines, for each query ray of a set of query rays, an conservative bounding volume and additional fine bounding volumes. The conservative bounding volume and fine bounding volumes are determinable using at least the displacement maps 402 and the polygonal meshes 214. The displacement acceleration module 114 determines bounding volume hierarchies 412 using the conservative bounding volume. A bounding volume hierarchy includes fine bounding volumes with increasing granularity. The displacement acceleration module 114 can then use the polygonal meshes 214, the displacement parameters 216, and the geometric quality 406 to produce a rendered textured surface 414 as described above with respect to FIGS. 1-3.

FIG. 5 is a flowchart of an example of another process 500 for rendering a textured surface using displacement-centric acceleration, according to some aspects of the present disclosure. One or more computing devices (e.g., the rendering system 102) implement operations depicted in FIG. 5 by executing suitable program code (e.g., the mapping module 112, the displacement acceleration module 114, or both). For illustrative purposes, the process 500 is described with reference to certain examples depicted in the figures. Other implementations, however, are possible.

At block 501, the process 500 involves producing a minmax MIP map for the displaced surface. In some examples, the rendering system 102 uses the mapping module 112 to produce the minmax MIP maps similar to that described above with respect to block 301 of FIG. 3. To generate the minmax MIP map, the mapping module 112 determines the maximum displacement value and the minimum displacement value associated with the points of the displaced surface. For the next level (i.e., the level with higher density or higher granularity), the mapping module 112 divides the displaced surface into regions. For each region, the mapping module 112 calculates the maximum displacement value and the minimum displacement value associated with the region. The mapping module 112 can repeat this process for each of the regions to divide it into sub-regions and calculate the maximum displacement value and the minimum displacement value associated with each sub-region. This process can be continued until a target granularity or density is reached. In some examples, the minmax MIP map is determined by the displacement acceleration module 114.

At block 502, the process 500 involves precomputing a conservative bounding volume for each polygon in the native base surface under consideration. Each conservative bounding volume includes a portion of the displaced surface as determined by the corresponding polygon and the minmax MIP map. Each conservative bounding volume can be used to determine increasingly granular fine bounding volumes and ultimately the intersections of query rays with the textured surface during the ray tracing. The rendering system 102 uses the displacement acceleration module 114 to perform the precomputations. In some examples, the displacement acceleration module 114 receives the native polygonal meshes 214 from the polygonal mesh engine 108 in which the polygonal meshes 214 represent or otherwise define a native base surface. The displacement acceleration module 114, or other suitable component of the computing environment 100, performs precomputations that include precomputing conservative bounding boxes.

At block 503, the process 500 involves selectively accessing a displacement parameter value and a geometric quality indicator for the query ray. In some systems, only one of the displacement parameter value or the geometric quality indicator may be set through input to the system. The term "selectively" when used herein to refer to a process or process block indicates the actions may occur or not occur, or partially occur depending on inputs, settings, or conditions as described. The displacement acceleration module 114 accesses the displacement parameter value from the displacement parameter adjustor 110. The displacement acceleration module 114 further obtains the geometric quality indicator. The displacement parameter and the geometric quality indicator may be pre-determined or obtained in real-time from other components of the system or through a user input. In some examples, the displacement acceleration module 114 accesses the displacement parameter value and/or the geometric quality indicator in substantially real-time.

At block 504, the process 500 involves selectively using one or more real-time displacement parameters to identify, for each conservative bounding volume, increasingly granular fine bounding volumes associated with each conservative bounding volume and the corresponding polygon of the native base surface. A displacement parameter may dictate how granular the hierarchy will be or how hierarchies will be repeated, so that the density of the ultimate representation of the textured surface can be adjusted. These adjustments do not change the base mesh or increase memory requirements for the process. At block 506, the process 500 involves determining, for each polygon of the native base surface, based on an intersection of one or more query rays with one or more of the fine bounding volumes, a 3D position and a texture coordinate for the textured surface to be rendered. The fine bounding volume for which the intersection is used can be determined in part by the geometric quality indicator. In some examples, the displacement acceleration module 114 selectively identifies the 3D positions and texture coordinates based on the geometric quality indicator. In additional examples, the displacement acceleration module 114 uses the displacement parameter value and the geometric quality indicator in substantially real-time. The functions of blocks 503-506 can be used in implementing a step for producing a 3D position and/or a texture coordinate for each polygon of the native base surface based on an intersection of a query ray with at least one of the fine bounding volumes corresponding to the polygon and associated with the conservative bounding volume.

Once it is determined that the an intersection of a query ray with a fine bounding volume of the relevant hierarchy is close enough to the intersection of the query ray with the displaced surface, processing proceeds, optionally without further use of the minmax MIP map. The actual, stored displacement map can be used in this small region. The geometric quality indicator dictates if and how the actual displacement map is used. For example, the highest geometric quality may dictate that the query ray intersection is determined using the information from the original displacement map. At block 508, the process 500 involves rendering the textured surface. The textured surface can be rendered using the texture coordinates, the 3D positions, or some combination of the two, depending on the rendering system. The textured surface can optionally be rendered with a varying level of detail by rendering different levels of detail across subsets of the bounding volume hierarchies as dictated by the geometric quality indicator. The displacement acceleration module 114 can use the geometric quality indicator to determine a type of approximation for intersections between the displaced surface and the query rays.

Figure 6:
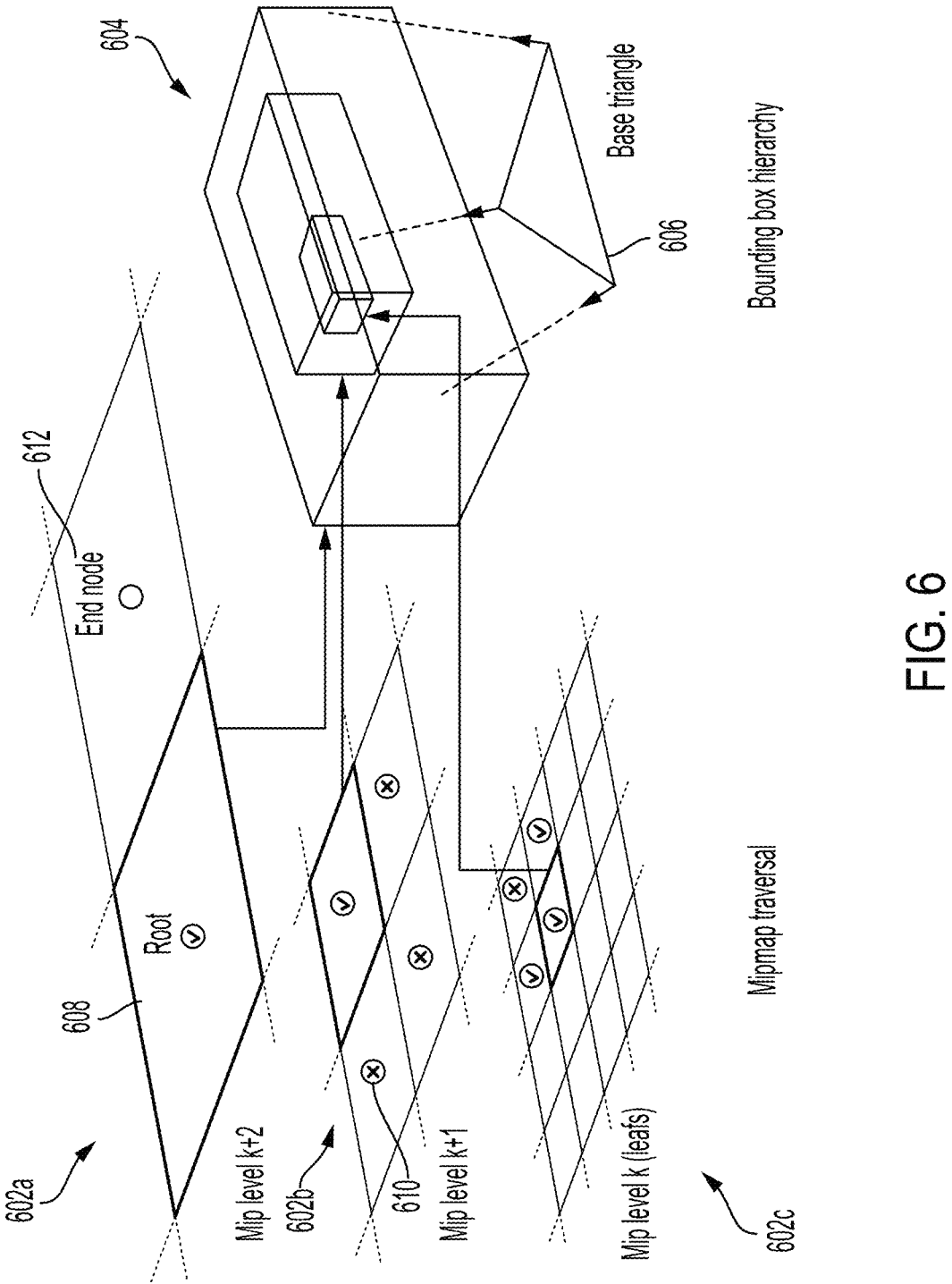
FIG. 6 is a schematic illustration of an example of the relationship between bounding volumes and map traversal, according to some aspects of the present disclosure.

FIG. 6 is a schematic illustration 600 of an example of the relationship between bounding volumes and MIP map traversal, according to some aspects of the present disclosure. As illustrated, FIG. 6 includes three map traversals 602a-c from root to leaf and nested bounding volumes 604 in a bounding volume hierarchy. The nested bounding volumes 604 correspond to a base triangle surface 606. In some examples, the nested bounding volumes 604 are definable by other suitable geometric objects. Given a query ray and a mapped bounding volume hierarchy, a goal of the minmax MIP map traversal is, for the given base triangle 606, to visit texels which generate a displaced surface that might intersect the query ray. The hierarchical nature of the minmax MIP map is used to perform early discard of large uv-domains and accelerate the traversal.

The MIP map defines an implicit graph structure in which nodes are texels (2 integer coordinates and 1 integer MIP level), and the child nodes of a node are the corresponding texels in the MIP level below (four child nodes in the example shown in FIG. 6). This implicit graph is not restricted to texels corresponding to actual displacement data, but also includes signed integer texel MIP layers and coordinates. This extension is useful to handle texture coordinates outside the unit square or uv-domains smaller than the finest input texels.

Starting the traversal from the root and assuming we have a criterion to identify leaf texels, a traversal can be a depth first search in a subtree of an infinite implicit graph as shown in FIG. 6. As the graph is implicit, the traversal is stack-less and pointer-less. Leafs can be defined as texels whose MIP levels are below a given target MIP level and for which the displaced surface has a closed form that can be directly intersected. At each traversed texel, a 3D axis-aligned bounding box is computed by combining bounds from the displacement bounding volume hierarchy (D-BVH) and information from the base triangle. The box is then intersected with the query ray using the slab method. This intersection determines if the hierarchy is traversed up or down or a texel is skipped. If the traversal arrives at a leaf, an actual intersection test is performed with the displaced surface, and the intersection information is updated accordingly. Pseudo-code for the traversal procedure is shown in Algorithm 1.

In some examples, minmax MIP map traversals handle integer level of detail essentially resource-free by simply skipping texels below a target level of interest. However, while a kernel support of the minmax MIP mapping includes the same size as standard box-MIP mapping, a height sampling function, in some examples, fetches data from outside the kernel support, even with simple bilinear filtering. Consequently, the level k of the minmax MIP map is not always a conservative estimate of the level k of the box-MIP-mapped input displacement. Therefore, in order to represent each displacement level of detail in the hierarchy, a recursion formula is slightly modified to additionally consider the height sampling $h^k(u, v)$ at MIP map level k:

$$M_{ij}^k = \text{minmax}\left( \underset{\substack{2i \le s \le 2i+1 \\ 2j \le t \le 2j+1}}{\text{minmax}} \left(M_{s,t}^{k-1}\right), \underset{\Omega_{ij}^k}{\text{minmax}}\left(h^k(u, v)\right) \right) \qquad (7)$$

The displaced surface in this example is linear with respect to the height. Therefore, the displaced surface at a linearly blended height from two consecutive integer level of details is the linear blend between the displaced surfaces at the respective level of details. More precisely, given a non-integer level of detail, l, such that k<l≤k+1, and a blending parameter λ=l−k, the displaced surface at l is defined as:

$$S^l(u, v) = P(u, v) + h^l(u, v)\hat{N}(u, v) \qquad (8)$$
$$= P + ((1 - \lambda)h^k + \lambda h^{k+1})\hat{N}$$
$$= (1 - \lambda)(P + h^k\hat{N}) + \lambda(P + h^{k+1}\hat{N})$$
$$= (1 - \lambda)S^k(u, v) + \lambda S^{k+1}(u, v)$$

The minmax MIP map, in some examples, provides bounds for the level of detail blended height. Regarding the upper bound:

$$\max_{\Omega_{ij}^k} h^l \le \max\left(\max_{\Omega_{ij}^k}(h^k), \max_{\Omega_{ij}^k}(h^{k+1})\right) \text{ By convex combination}$$
$$\le \max\left(\overline{M}_{ij}^k, \max_{\Omega_{i/2,j/2}^{k+1}}(h^{k+1})\right) \quad \text{Since } \Omega_{ij}^k \subset \Omega_{i/2,j/2}^{k+1}$$
$$\le \overline{M}_{i/2,j/2}^{k+1} \qquad \text{Using Equation 7}$$

and similarly, for the lower bound:

$$\Omega_{ij,min}^k h^l \ge M_{\frac{i}{2},\frac{j}{2}}^{k+1}.$$

Thus, a traversal intersects the displaced surface at a non-integer level of detail by simply modifying Equation 5 such that texel $$M_{\frac{i}{2},\frac{j}{2}}^{k+1}$$

is fetched instead of texel $$M_{ij}^k.$$

For local intersections involving continuous height sampling, the displaced surface is continuous with respect to the level of detail. For local intersections involving discrete height sampling, the displaced surface is not continuous with respect to the level of detail, as the sampling pattern for a given level k changes when l crosses k. However, the non-integer level of detail still provides visually appealing morphing between integer levels of details.

In some examples, nodes are traversed while outside the uv-domain of the triangle of interest. The nodes are discarded before computing a bounding volume, as a displaced surface considered at the node or its children would fail the barycentric clipping test. In order to identify the nodes during traversal, a node is identified that overlaps the triangle. Some techniques to perform the identification include standard polygon collision algorithms, pairwise edge intersection, or using a separating axis. In an example in which the triangle is fixed and is tested against many squares, a custom node-triangle collision test is implemented, In one example, order to begin traversal, a root texel is identified. The root texel includes the base triangle of interest. Assuming the triangle texture coordinates are positive, one solution involves taking a smallest texel containing the triangle uv-bounding box. However, this strategy performs poorly in a case in which the base triangle overlaps two large texels, as the root remains unchanged regardless of how small the triangle is. A more practical solution involves identifying up to four neighboring roots so a union contains the base triangle. This is different from the single root solution as the four neighboring roots do not have to be children of the same unique node. In some examples, the size of the uv-domain covered by the root union is not more than twice the size of the triangle bounding box in a largest dimension.

In some examples, traversal is stackless and pointerless, meaning that a subsequent node to visit is directly obtained from a current node, more than one possible order is possible for visiting the four children of a given node. However, such fixed order is inefficient in some examples for certain rays, as intersection candidates are considered in the reverse order of associated distance along the query ray, possibly making the traversal reach leaves several times unnecessarily.

Traditional bounding volume hierarchy traversals strategy can be adapted to sort children according to the ray direction in object space. For example, the ray direction in uv-space is considered to decide the traversal order, which, in practice, modifies down and next functions from associated algorithms. A number of traversed nodes is noticeably reduced. However, this performance benefit depends on ray coherence.

In some examples, a base surface model is a triangle mesh, in which a position and a normal are obtained by linearly interpolating vertex attributes and for which Equation 1 is computable for each individual triangle. Given vertex positions $p_i$, normals $n_i$ and texture coordinates $u_i$ and $v_i$ for the triangle three vertices:

$$\mathcal{T}_{uv}^b = \begin{pmatrix} u_1 & u_2 & u_3 \\ v_1 & v_2 & v_3 \\ 1 & 1 & 1 \end{pmatrix}^{-1} \qquad (9)$$

$$P(u, v) = \begin{pmatrix} | & | & | \\ p_1 & p_2 & p_3 \\ | & | & | \end{pmatrix} \mathcal{T}_{uv}^b \begin{pmatrix} u \\ v \\ 1 \end{pmatrix} \qquad (10)$$

$$N(u, v) = \begin{pmatrix} | & | & | \\ n_1 & n_2 & n_3 \\ | & | & | \end{pmatrix} \mathcal{T}_{uv}^b \begin{pmatrix} u \\ v \\ 1 \end{pmatrix} \qquad (11)$$

where $$\mathcal{T}_{uv}^b$$

is a 3×3 matrix that computes barycentric coordinates of a point given uv-texture coordinates. Scalar displacement maps are used and are equipped with a sampling operator, over which a mapped D-BVH is built.

During traversal, positions and normals are computed in the local uv-aligned tangent space. This local space coincides with the base triangle when z=0. Its first two axes are aligned with the u and v axes and its third axis is the base triangle geometric normal. This local space is used instead of object space to minimize the bounding box's volume as the bounding volumes are likely to be aligned with the displaced surface.

A simplest local intersection test can be performed to return the intersection with the leaf aligned-axis bounding box. Since the box and associated intersection with the query ray are computed associated with the traversal, this leaf-box intersection has no associated processing overhead. While the resulting surface includes piece-wise constant normals, the intersection is useful in scenarios in which intersection precision is not critical and in which no shading information is available such as with shadow rays. The surface additionally includes a voxelized aspect, which, in some examples, is artistically appealing.

One way to perform a pre-tessellation of a displaced mesh is to compute one vertex per texel corner at a lowest MIP level with two triangles per border-aligned texel. The local triangulation is a local intersection test that matches the pre-tessellation. At the leaf scale, the uv-domain is a center-aligned texel that overlaps four border-aligned texels. Once a leaf is reached, for each of the border-aligned texels, two triangles are computed on-the-fly that are analytically intersected with the ray. The resulting surface is continuous, and includes sufficient shading quality for a range of distances along the ray, or when the displacement map is characterized by a high resolution.

At the leaf scale, as the current texel and associated neighbors are known, and the height sampling has a closed form formula for both bilinear and B-spline interpolation schemes. As the surface includes an explicit parametric formula, iterative optimization methods are usable to find the intersection. The B-spline scheme adds over the base surface a C1 surface everywhere and provides a high geometric quality. However, the B-spline scheme includes a higher computational cost than the previously mentioned local intersections. The methods described herein are implementable on a GPU, and are applicable to any ray tracing system supporting custom geometries such as geometries defined by one or more associated bounding boxes. A ray tracing program usable for the above-described methods is implementable by a set of components. The first component involves control flow for a ray, using different programmable shaders for each stage. The second component involves the acceleration structure for a scene. Such structure is characterized by two levels: a top level acceleration structure (TLAS) representing the object instances in the scene, and the bottom level acceleration structures (BLAS), each representing distinct objects. The final component, the binding shader table (SBT), is a data structure that links acceleration structures with the control flow. The SBT assigns, for each instance, a set of programmable shaders to use as well as instance-specific inline data to be used at the different stages of the ray tracing pipeline.

As seen from Equation 1, the displaced surface is continuous whenever the texel's coordinates, the base surface, and the displacement are continuous. For intersection tests based on continuous height sampling such as B-spline interpolation, the displaced surface is watertight for any fixed integer of fractional level of detail (LoD). Note however that in practice, because of the iterative optimization scheme, intersections can be missed. For intersection tests based on local triangulation, the two-triangle-per-leaf-solution is not watertight as the generated micro-triangles from two different base primitives do not have to match at the edge between the two base primitives. The possible cracks are only visible when leafs size is close to the base primitive size in uv space, which rarely occurs with high-resolution displacement maps from low-poly base surfaces. A practical solution to this issue if necessary however is to clip the leaf texel against the base triangle in uv space, triangulate the resulting polygon, and generate the associated displaced micro-triangles. Note that this solution can be computationally expensive as it requires up to five micro-triangles instead of two.

A custom intersection shader for objects with displacement can be used. The BLAS of each displaced object is computed. For each instance of a displaced object, the use of the custom intersection shader is declared in the SBT. In addition, data from the mapped bounding volume hierarchy such as displacement parameters is also declared.

As the displaced object is a custom geometry, its BLAS is constructed using a list of axis-aligned bounding boxes in object space in which each box bounds the displaced surface generated by a triangle of the base surface. Affine arithmetic is usable to estimate the boxes. However, there are some differences in the BLAS context. The minmax MIP map stores displacement bounds to uv-domains that correspond to texels, not triangles. Additionally, each intersection between the ray and one of the bounding boxes, in some examples, triggers a computationally expensive call to an intersection shader, in which tight boxes are crucial for performance efficiency. Additionally, affine arithmetic works on zonohedron domains, which are convex polygons with central symmetry. Therefore, using affine arithmetic directly, for example on the uv-bounding box of the triangle, would yield estimated quantities outside the triangle domain, which are poor estimates. Affine arithmetic is performable on a triangle domain by considering a triangle as a union of three overlapping parallelograms. Therefore, affine arithmetic can be used separately for each parallelogram and merge the estimated boxes. The affine form for a parallelogram uv-domain is adapted from Equation 6:

$$uv = \frac{1}{2}[e_0 + e_1, e_0 - v, e_1 - v, (0, 0)]$$

In which v is one of the triangle uv-vertices, and $e_0$ and $e_1$ are mid-points of the two triangle edges associated with v.

It is possible to adapt the traversal to compute a conservative estimate by visiting all texels overlapping the triangle. However, this strategy is computationally expensive for a large number of base triangle or with a high resolution displacement since BLAS boxes are recomputed each time the displacement is changed globally such as with scaling or tiling modifications. To better fit the interactive context, traversal is restricted to visit the roots, which gives conservative displacement bounds per triangle in constant time. In some examples, computation of the BLAS boxes span approximately 50 milliseconds on a single CPU core for a base mesh with 50,000 vertices.

For base surfaces generated from triangle meshes, texels can be traversed while being completely outside the uv domain of the base triangle of interest. Those texels can be discarded early before computing a bounding box, as any point where the displaced surface generated from those texels would fail the barycentric clipping test. In order to identify these nodes during traversal, a standard polygon intersection can be used. Where the triangle is fixed and is tested against many squares, a custom node-triangle collision test can also be implemented. In order to start a traversal, a root texel, which contains the base triangle of interest is located. One way to locate the root texel is to find up to four neighboring roots so that their union contains the base triangle. The traversal with multiple roots performs algorithm 1 once for each individual root.

The pseudo-code from algorithm 1 gives an example of procedure to obtain the next texel to traverse thanks to the next and down functions. However, such fixed order can be inefficient for certain rays, as intersection candidates could be considered in the reverse order of their distance along the ray, thus possibly making the traversal reach leaves several times unnecessarily. A traditional BVH traversal strategy can be adapted to sort children according to the ray direction in object space. Alternatively, the ray direction in uv space can be determined to decide the traversal order, which in practice modifies the down and next selections from algorithm 1. The benefit in terms of performance depends on the ray coherence.

Bounding volume hierarchy-related data structures can be characterized by memory layout data structures as well as by implications for interactive displacement. A mapped bounding volume hierarchy is composed of two textures, a displacement map and associated minmax MIP map. Mapping a displaced bounding volume hierarchy onto a base mesh involves creating a displaced object, which, in addition to references to the base mesh and to the mapped-bounding volume hierarchy, additionally includes displacement-related parameters, a BLAS, and a buffer for per-triangle precomputed data. The parameters are included as inline data in the SBT and are modified interactively. The triangle buffer is optional since triangle buffer data is computed on the fly in the intersection shader. However, pre-computing per-triangle data is useful for improving performance and improving precision. Most notably, the matrix $$\mathcal{T}_{uv}^{b}$$

from Equation 9 is inverted, which is a computationally expensive operation associated with the GPU. Moreover, the matrices are ill-conditioned so double-precision is required during inversion to prevent artifacts.

The displacement parameters allow interactive modification of the appearance of the displaced surface, both locally and globally. Modifying the texture transform changes the way the displacement is mapped onto the base surface. For example, for a tile-able displacement map, the uv is scaled to increase the visual resolution of the displacement. The displacement offset, scaling, and bias allow a global linear transformation of the displacement values:

$$h'(u, v) = \text{offset} + \text{scaling} \cdot (h(u, v) - \text{bias})$$

As this operation is linear, it has a very low impact on the affine arithmetic computations. While simple, it has several useful subcases.

Regarding standard scaling in which an offset equals a bias, which equals zero, the standard scaling leads to a "swollen" effect for large scaling values, as increasing displacement contrasts also increases the displacement amplitude. Regarding volume-preserving scaling in which bias equals mean displacement, volume-preserving scaling increases the displacement contrasts without modifying the overall object volume. The mean displacement is retrieved using the topmost texel of the displacement MIP map. Regarding surface dilation/erosion, in which scaling equals zero, by applying a constant displacement everywhere, the base surface dilation, in which an offset is greater than zero, or erosion, in which the offset is less than zero, is intersected.

Various algorithms are useable to perform the above-discussed functions. Algorithm 1 is an algorithm for performing MIP map traversal for ray tracing. The root( ) function computes the traversal starting node, and the outside( ) function performs early node discard. The local_intersection( ) function performs the actual surface intersection, whose expression depends on the height sampling. Algorithm 2 is an algorithm for performing displacement bounds for bottom level acceleration structure (BLAS) computations. Algorithm 3 is an algorithm for defining displaced object data structures.

---

Algorithm 1: Mipmap traversal for ray tracing
The root function, which computes the traversal starting node, and the outside function, which performs early node discard, are described in subsection 4.4. The local_intersection function performs the actual surface intersection, whose expression depends on the height sampling, as detailed in section 5.

---

```
Function down(node):
  | —node.lod
  L node.ij *^= 2
Function up(node):
  | ++node.lod
  L node.ij /= 2
Function next(node):
  | while true do
  |   | switch 2^(node.i % 2) + node.j % 2 do
  |   |   | case 1 do
  |   |   |   | —node.j
  |   |   |   | ++node.i
  |   |   |   | return
  |   |   | case 3 do
  |   |   |   | up(node)
  |   |   |   | continue
  |   |   | else
  |   |   |   | ++node.j
  L   L   L   L return
Function traversal(ray, triangle, target lod):
  | intersection = empty
  | node = root (triangle)
  | end node = next (node)
  | while node ≠ end node do
  |   | if outside (node, triangle) or miss(ray, box (node))
  |   | then
  |   |   | node = next(node)
  |   | else if node.lod ≤ target lod then
  |   |   | hit = local_intersection (node, ray)
  |   |   | if hit and barycentric test(hit) then
  |   |   |   | update intersection, ray from hit
  |   |   | node = next(node)
  |   | else
  L   L   L node = down(node)
```

---

Algoritham 2: Displacemest bounds tor BLAS computation

---

```
Function traversal (triangle):
  | bounds = ∞ · [1, −1]
  | node = root (triangle)
  | end node = next(node)
  | while node ≠ end node do
  |   | if outside(node, triangle) then
  |   |   | node = next(node)
  |   | else if inside(node, triangle) or node.lod = = 0 then
  |   |   | bounds = minmax(bounds, minmax(node))
  |   |   | node = next(node)
  |   | else
  L   L   L node = down(node)
```

---

Algorithm 3: Displaced object data structures

---

```
struct MappedBVH {
    Texture1f displacement_mipmap;
    Texture2f minmax_minmap;
};
struct DisplacementParameters {
    mat3 texture_transform;
    float offset, bias, scaling;
    float target_level_ of_detail;
```

-continued

---

Algorithm 3: Displaced object data structures

---

```
    nint intersection_type;
};
struct DisplacedTriangleData {
    mat4 object_to_triangle_uv_ space;
    mat3 uv_to_barycentrics, uv_to_position,
        uv_to_normal;
    vec3 geometric_normal;
},
struct DisplacedObject {
    Mesh * base_mesh ;
    MappedBVH* mapped_bvh;
    DisplacementParameters parameters;
    BLAS blas;
    Buffer<DisplacedTriangleData> triangle_buffer;
};
```

---

Examples of computing environments for implementing certain implementations

Figure 7:
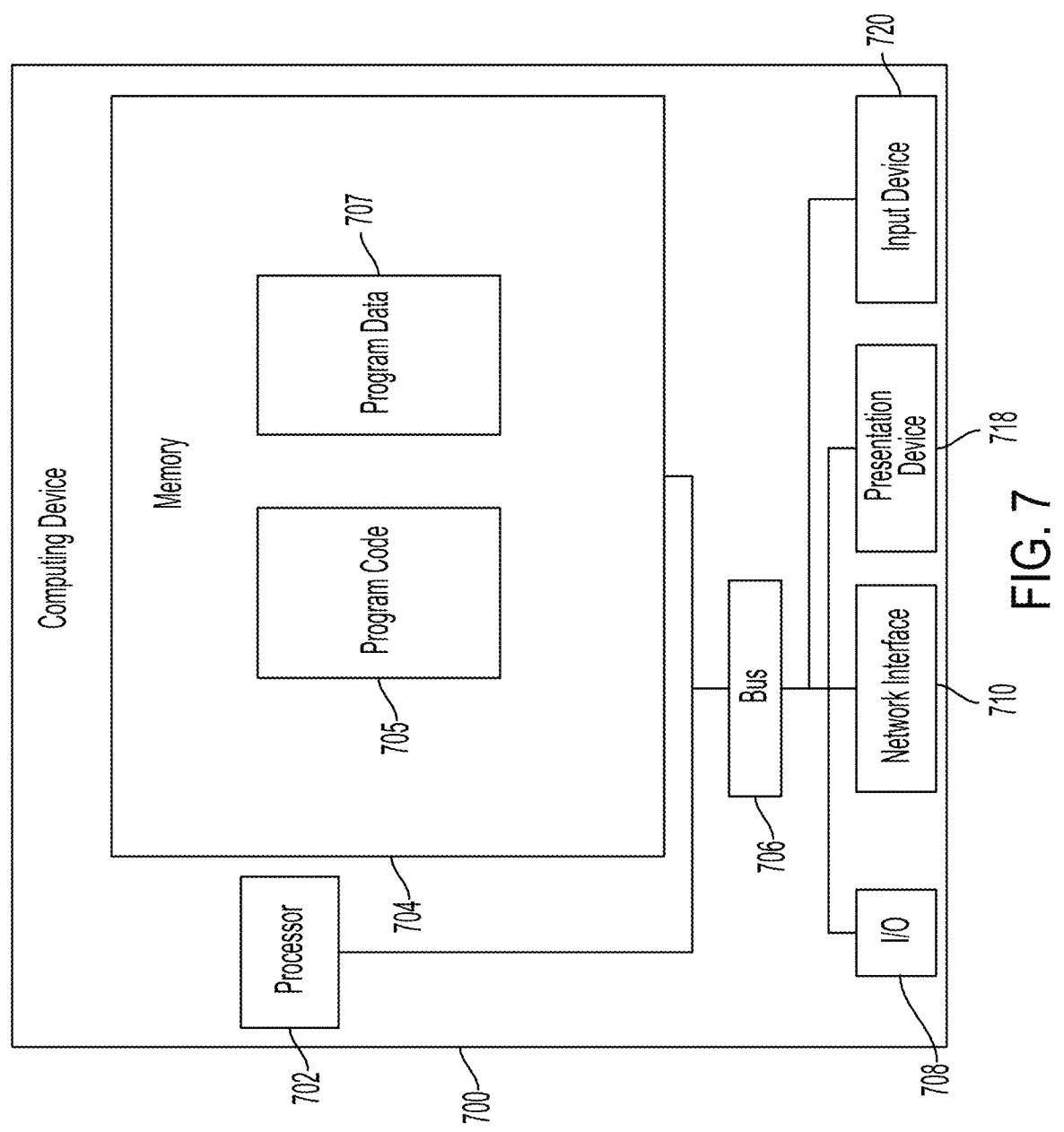
FIG. 7 is a diagram of an example of a computing system that can implement the computing environment of FIG. 1, according to certain embodiments.

Any suitable computing system or group of computing systems can be used for performing the operations described herein. For example, FIG. 7 depicts an example of computing device 700 that may be at least a portion of a computing environment 100. The implementation of the computing device 700 could be used for the rendering system 102 or other suitable system of the computing environment 100 or system 400. In an implementation, a single computing environment 100 having devices similar to those depicted in FIG. 7 (e.g., a processor, a memory, etc.) combines the one or more systems, modules, and data stores depicted as separate subsystems in FIG. 1.

FIG. 7 illustrates a block diagram of an example computing device 700. The computing device 700 can be or include, for example, a laptop computer, desktop computer, tablet, server, or other electronic device.

The computing device 700 can include a processor 735 interfaced with other hardware via a bus 705. A memory 710, which can include any suitable tangible (and non-transitory) computer readable medium, such as RAM, ROM, EEPROM, or the like, can embody program components (e.g., program code 715) that configure operation of the computing device 700. Memory 710 can store the program code 715, program data 717, or both. In some examples, the computing device 700 can include input/output ("I/O") interface components 725 (e.g., for interfacing with a display, keyboard, mouse, and the like) and additional storage 730.

The computing device 700 executes program code 715 that configures the processor 735 to perform one or more of the operations described herein. Examples of the program code 715 include, in various implementations, the rendering system 102 including the displacement acceleration module 114 and the mapping module 112, or any other suitable systems or subsystems that perform one or more operations described herein. The program code 715 may be resident in the memory 710 or any suitable computer-readable medium and may be executed by the processor 740 or any other suitable processor.

The computing device 700 may generate or receive program data 717 by virtue of executing the program code 715. For example, the query ray and the texel information are examples of program data 717 that may be used by the computing device 700 during execution of the program code 715.

The computing device 700 can include network components 720. Network components 720 can represent one or more of any components that facilitate a network connection. In some examples, the network components 720 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 720 can be wired and can include interfaces such as Ethernet, USB, or IEEE 1394.

Although FIG. 7 depicts a single computing device 700 with a single processor 735, the system can include any number of computing devices 700 and any number of processors 735. For example, multiple computing devices 700 or multiple processors 735 can be distributed over a wired or wireless network (e.g., a Wide Area Network, Local Area Network, or the Internet). The multiple computing devices 700 or multiple processors 735 can perform any of the steps of the present disclosure individually or in coordination with one another.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" herein is meant as open and inclusive language that does not foreclose devices adapted to or configured to perform additional tasks or steps. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:

accessing, by a rendering system, a base surface defined by a mesh of polygons;

precomputing a base-surface independent acceleration structure based on minimum values of displacement and maximum values of displacement relating to texels of a displaced surface; and for a polygon of the base surface:

identifying, by a displacement acceleration module of the rendering system and by using (i) at least one real-time displacement parameter value, and (ii) a precomputed conservative bounding volume determined by the polygon and the base-surface independent acceleration structure, a plurality of increasingly granular bounding volumes corresponding to the polygon;

determining, by the displacement acceleration module, an intersection of a query ray with at least one of the plurality of increasingly granular bounding volumes to provide at least one of a 3D position or a texture coordinate; and storing, by the displacement acceleration module, the at least one of the 3D position or the texture coordinate configured for rendering a textured surface using the base surface.

2. The method of claim 1, wherein at least one of the conservative bounding volume or the plurality of increasingly granular bounding volumes comprises an axis-aligned bounding box.

3. The method of claim 1, wherein the base-surface independent acceleration structure comprises a minmax multum in parvo (MIP) map.

4. The method of claim 1 further comprising rendering, by a rendering system, the textured surface using at least one of the 3D position or the texture coordinate.

5. The method of claim 4, further comprising:

selectively accessing a real-time geometric quality indicator; and selectively using, by the rendering system, the real-time geometric quality indicator to render the textured surface.

6. The method of claim 4, further comprising rendering, by the rendering system, the textured surface with a varying level of detail by rendering different levels of detail across the mesh of polygons.

7. The method of claim 1, wherein precomputing the base-surface independent acceleration structure further comprises:

sampling the displaced surface over its dimensions;

computing a base level of a minmax multum in parvo (MIP) map using height sampling;

recursively computing other levels of the minmax MIP map from a bottom level; and storing the minmax MIP map as the base-surface independent acceleration structure.

8. A system comprising:

a processor; and a memory device configured to store a base surface defined by a mesh of polygons and a base-surface independent acceleration structure based on minimum values and maximum values of displacement related to texels of a displaced surface, the memory device further storing a displacement acceleration module executable by the processor for performing operations; comprising:

identifying, by using (i) at least one real-time displacement parameter value, and (ii) a precomputed conservative bounding volume determined by a polygon of the base surface and the base-surface independent acceleration structure, a plurality of increasingly granular bounding volumes;

producing a 3D position and a texture coordinate based on an intersection of a query ray with at least one of the plurality of increasingly granular bounding volumes; and rendering a textured surface using at least one of the 3D position or the texture coordinate for the polygon.

9. The system of claim 8, wherein at least one of the conservative bounding volume or the plurality of increasingly granular bounding volumes comprises an axis-aligned bounding box.

10. The system of claim 8, wherein the base-surface independent acceleration structure comprises a minmax multum in parvo (MIP) map.

11. The system of claim 8, the operations further comprising:

selectively accessing a real-time geometric quality indicator; and selectively using the real-time geometric quality indicator to render the textured surface.

12. The system of claim 8, wherein the textured surface comprises a varying level of detail across the mesh of polygons.

13. The system of claim 8, further comprising a mapping module configured to produce the base-surface independent acceleration structure.

14. The system of claim 13, wherein the mapping module is executable by the processor for performing operations comprising:

sampling the displaced surface over its dimensions;

computing a base level of a minmax multum in parvo (MIP) map using height sampling;

recursively computing other levels of the minmax MIP map from a bottom level; and storing the minmax MIP map as the base-surface independent acceleration structure.

15. A non-transitory computer-readable medium storing program code executable by a processor to perform operations, the operations comprising:

accessing a base surface defined by a mesh of polygons;

precomputing a base-surface independent acceleration structure based on minimum values of displacement and maximum values of displacement relating to texels of a displaced surface;

a step for producing a 3D position and a texture coordinate for a polygon based on an intersection of a query ray with at least one of a plurality of increasingly granular bounding volumes corresponding to the polygon and associated with a conservative bounding volume including, for each polygon of the mesh of polygons, a portion of the displaced surface;

selectively using at least one real-time displacement parameter value to identify the at least one of the plurality of increasingly granular bounding volumes; and rendering a textured surface using at least one of the 3D position or the texture coordinate for the polygon.

16. The non-transitory computer-readable medium of claim 15, wherein at least one of the conservative bounding volume or the plurality of increasingly granular bounding volumes comprises an axis-aligned bounding box.

17. The non-transitory computer-readable medium of claim 15, wherein the base-surface independent acceleration structure comprises a minmax multum in parvo (MIP) map.

18. The non-transitory computer-readable medium of claim 15, the operations further comprising:

selectively accessing a real-time geometric quality indicator; and selectively using the real-time geometric quality indicator to render the textured surface.

19. The non-transitory computer-readable medium of claim 15, wherein the textured surface comprises a varying level of detail across the mesh of polygons.

20. The non-transitory computer-readable medium of claim 15, wherein the operation of precomputing the base-surface independent acceleration structure further comprises operations of:

sampling the displaced surface over its dimensions;

computing a base level of a minmax multum in parvo (MIP) map using height sampling;

recursively computing other levels of the minmax MIP map from a bottom level; and storing the minmax MIP map as the base-surface independent acceleration structure.

* * * * *